United States Patent [19]
Hulsing, II

[11] Patent Number: 5,696,323
[45] Date of Patent: Dec. 9, 1997

[54] TWO BAR RESONANT BEAM CORIOLIS RATE SENSOR

[75] Inventor: Rand H. Hulsing, II, Redmond, Wash.

[73] Assignee: AlliedSignal, Inc., Morristown, N.J.

[21] Appl. No.: 673,700

[22] Filed: Jun. 25, 1996

[51] Int. Cl.[6] .................................................. G01P 9/04
[52] U.S. Cl. ............................................... 73/504.12
[58] Field of Search .......................... 73/504.04, 504.12, 73/504.13, 504.14, 504.15, 504.16

[56] References Cited

U.S. PATENT DOCUMENTS

| | | | |
|---|---|---|---|
| 5,226,321 | 7/1993 | Varnham et al. | 73/504.13 |
| 5,329,815 | 7/1994 | Dunn et al. | 73/504.12 |
| 5,349,855 | 9/1994 | Bernstein et al. | 73/504.16 |
| 5,476,007 | 12/1995 | Nakamura | 73/504.12 |

Primary Examiner—John E. Chapman

[57] ABSTRACT

By configuring a mounting ring connected to a center block with a pair of flexures and having a pair of vibrating beam force transducers connected between the mounting ring and the center block, an angular rate sensor utilizing Coriolis acceleration can be fabricated out of silicon. In this sensor, vibration of the sides of the mounting ring along an axis normal to the angular rate axis is provided by a source of magnetic flux which interacts with a drive current applied through conductors deposited on the mounting ring. The magnetic flux is provided by a permanent magnet and a pair of pole pieces that encompass the mounting ring. A digital representation of angular rate is generated by demodulating the frequency of the force transducers by the frequency of vibration drive frequency to obtain the difference in the force transducer frequencies.

23 Claims, 4 Drawing Sheets

TWO BAR RESONANT BEAM CORIOLIS RATE SENSOR

FIELD OF THE INVENTION

The invention relates to field of angular rate sensors that utilize the Coriolis acceleration effect to measure the angular rate of rotation of the sensor and in particular to such angular rate sensors that do not use a constrained gimbal structure and that can be configured out of a single block of silicon.

BACKGROUND OF THE INVENTION

In previous tuning-fork type angular rate sensors that utilize the Coriolis effect, for example of the type shown in U.S. Pat. No. 5,349,855, it has been necessary to extract a relatively small AC signal from an unconstrained gimbal structure. In these types of rate sensors, a pair of proof masses are vibrated in the plane of a substrate while at the same time the proof masses will tend to move in and out of the plane of the substrate in response to Coriolis forces. In order to determine the position of the proof masses, a capacitive pickoff arrangement is used where it is desirable to have large areas for pickoff capacitors while at the same time it is desirable to have very small capacitor gaps in order to provide the maximum signal sensitivity. As a result of the geometry of these sensors, the analog signals produced by the pickoffs are subject to high noise as well as being subject to demodulation bias errors and analog to digital conversion errors.

SUMMARY OF THE INVENTION

It is therefore an object of the invention to provide an angular rate sensor utilizing the Coriolis effect that has a direct digital signal output. Further, it is an object of the invention to provide such a sensor that does not use a capacitive pickoff to generate sensor output signals and that can be fabricated without trimming.

An additional object of the invention is to provide an angular rate sensor having a inertia ring connected to a center block by a pair of flexures that permits torsional rotation of the inertia ring along the angular rate axis combined with a pair of vibrating beam force sensing transducers connected between the inertia ring and said center block in a push-pull arrangement and in a manner to constrain said inertia ring from rotating about said angular rate axis. The sensor also includes a magnetic drive circuit for vibrating the sides of the inertia ring sides in opposite directions along a vibration axis normal to said rate axis and a processing circuit, responsive to the force sensing transducers and the drive circuit, for generating a signal representing the angular rate of the sensor around said angular rate axis.

Another object of the invention is to provide an angular rate sensor having a mounting ring; a center block; a pair of flexures for mounting the ring on the center block for torsional rotation along an inertia angular rate axis and a pair of dual beam force sensing transducers connected between the inertia ring and the center block in a push-pull arrangement in a manner to constrain said inertia ring from rotating about said angular rate axis, all of which are configured out of a single block of silicon. Additionally, the sensor includes a source of magnetic flux having a pair of pole pieces located on either side of said inertia ring with a permanent magnet secured between the pole pieces. A drive circuit having a pair of conductors formed on one side of the inertia ring responds to the magnetic flux to vibrate the sides of the inertia ring in opposite directions along a vibration axis normal to the rate axis and a processing circuit, responsive to the force sensing transducers and the drive circuit generates an angular rate signal representing the angular rate of the sensor around the angular rate axis. To improve the sensitivity of the sensor, the force sensing transducers are offset from the angular rate axis, preferably by attaching them to the outer surfaces of the inertia ring and the center block, such that the ratio of the offset distance to the distance between the angular rate axis and the ends of the inertia ring is approximately equal to 25.

DETAILED DESCRIPTION OF THE PREFERRED EMBODIMENTS

Figure 1:
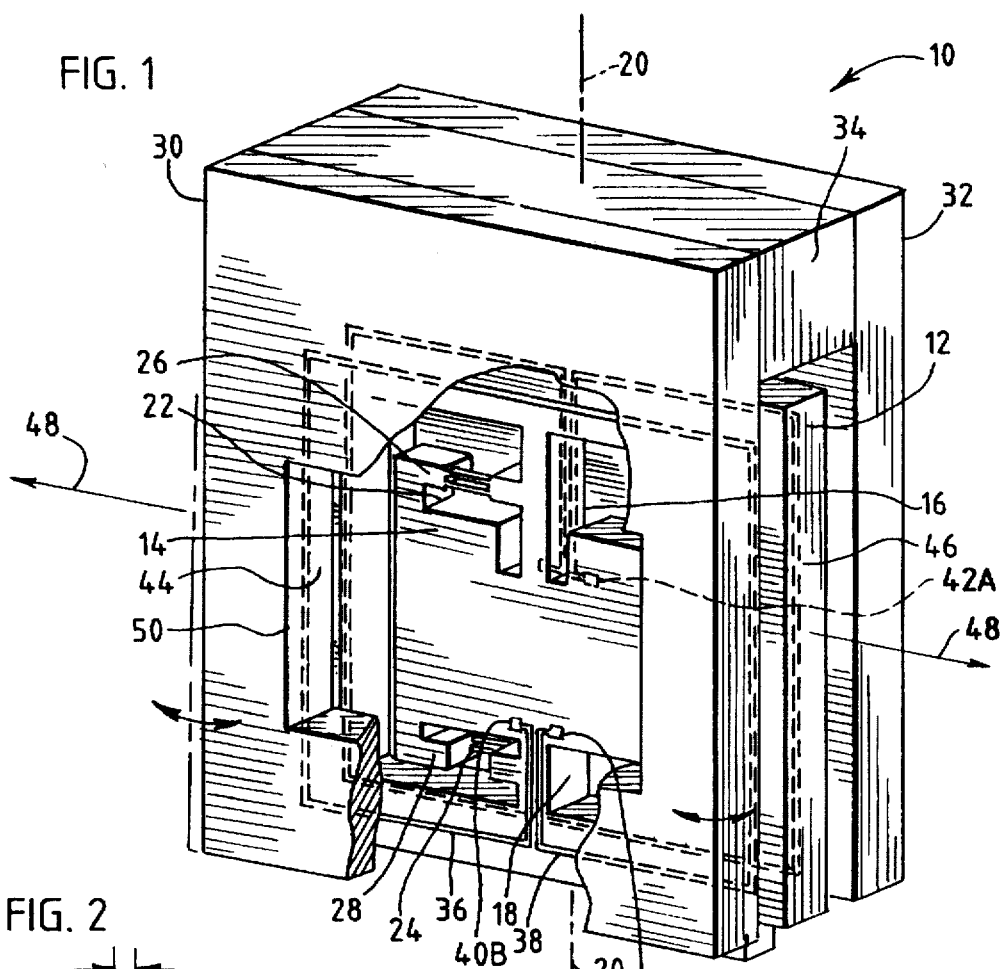
FIG. 1. is a partially sectioned away perspective view of an angular rate sensor according to the invention.
Figure 2:
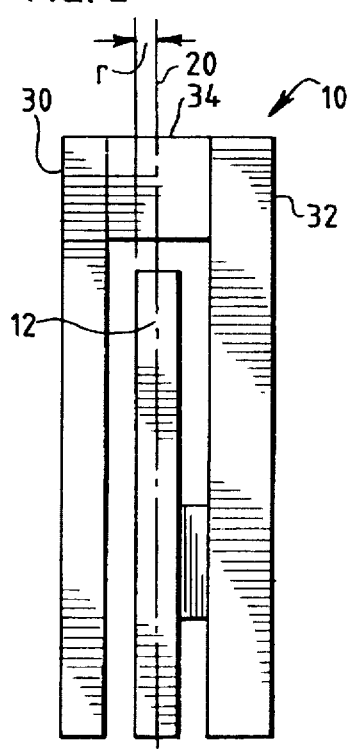
FIG. 2 is a side view of the sensor of FIG. 1.
Figure 3:
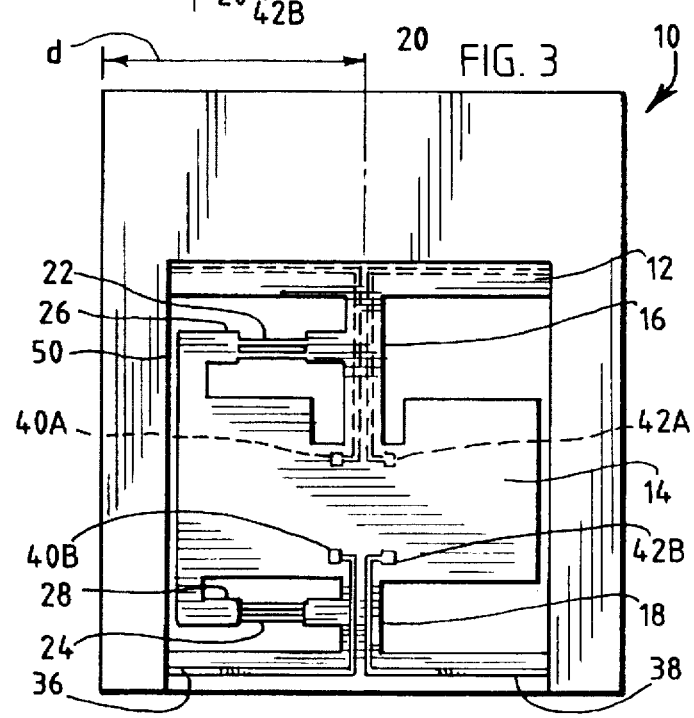
FIG. 3 is a front plan view of the sensor of FIG. 1.
Figure 4:
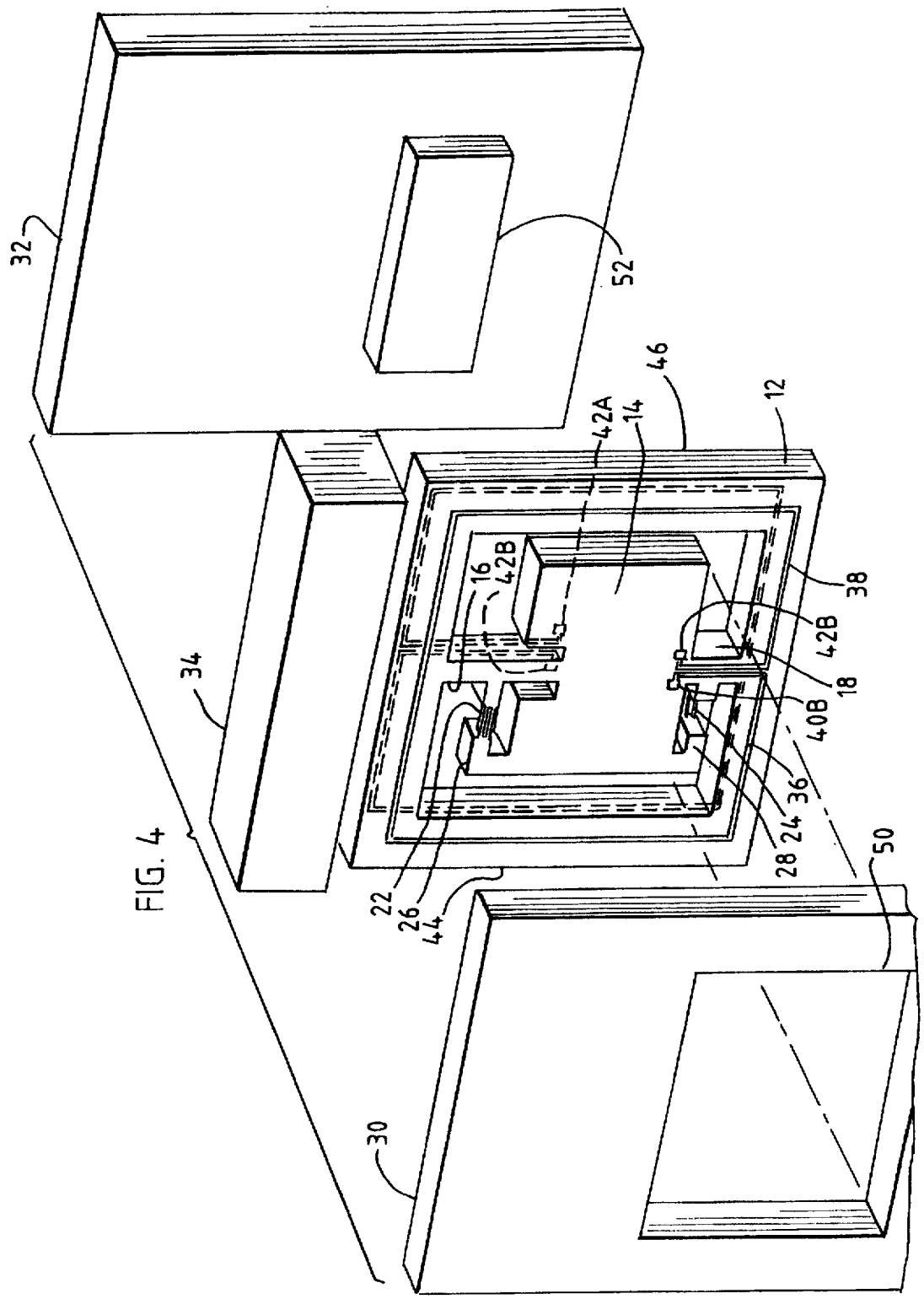
FIG. 4 is a perspective exploded view of the sensor of FIG. 1.
Figure 5:
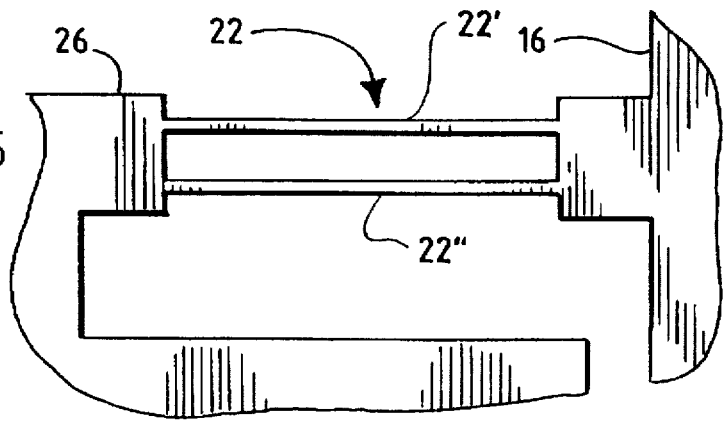
FIG. 5 is a plan view of a vibrating dual beam force transducer for use with the sensor of FIG. 1.
Figure 7:
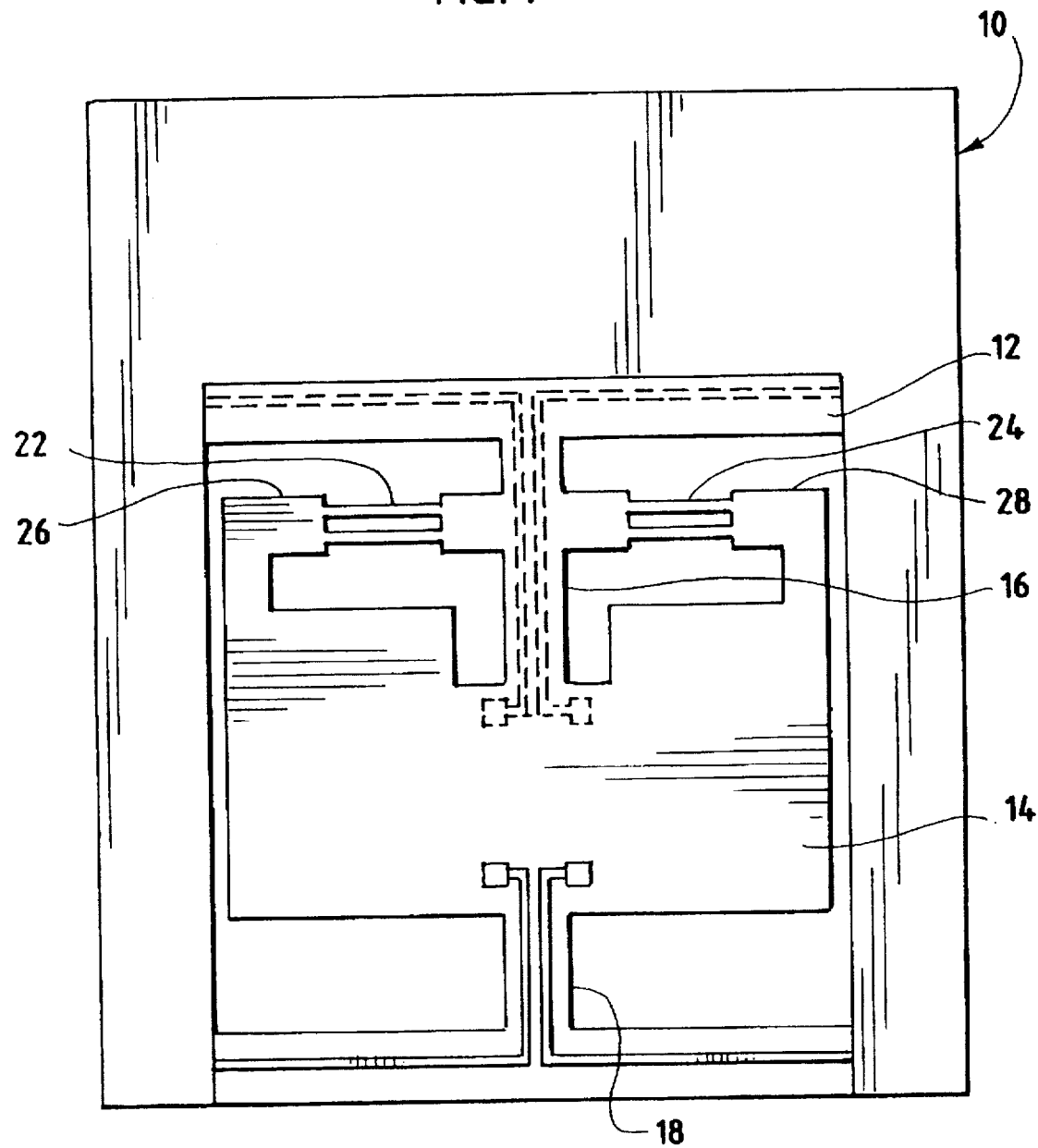
FIG. 7 is a view of a modified angular rate sensor according to the invention.

As illustrated in FIGS. 1—4, the preferred embodiment of an angular rate sensor includes a rectangular inertia ring 12 connected to a center block 14 by a pair of torsional flexures 16 and 18. The flexures 16 and 18 are dimensioned to permit the inertia ring 12 to rotate about an angular rate axis 20 as shown in FIG. 1 at a predetermine natural frequency. A pair of force transducers 22 and 24, preferably dual vibrating beam force transducers of the type described in detail in U.S. Pat. Nos. 5,005,413 and 5,456,110, are connected between the inertia ring 12 and the center block 14 in such a manner as to constrain the inertia ring 12 from rotating freely rotating about the angular rate axis 20. A detailed view of the force transducer 22 is provided in FIG. 5 showing a pair of vibrating tines 22' and 22". The force transducers 22 and 24 are arranged in a push-pull configuration such that the difference frequency output of the transducers 22 and 24 will be proportional to the rate of rotation of the sensor about the axis 20. Preferably, as illustrated in FIGS. 1, 3 and 4, the force transducers 22 and 24 are located on the same side of the flexures 16 and 18 and connected to a pair of projections 26 and 28 of the center block 14 on outer surfaces of the center block 14 and the flexures 16 and 18. It will be appreciated, however, that a push-pull arrangement of the transducers 22 and 24 can be achieved a number of different ways including connecting the transducers 22 and 24 on the same surface of the inertia ring 12 but on opposite sides of the flexures 16 and 18, as shown in FIG. 7. The location of the transducers 22 and 24 as shown in FIGS. 1, 3 and 4 is preferred, however, because it eliminates common mode linear acceleration effects. By locating the attachments of the force transducers 22 and 24 at the surfaces of the center block 14 and the flexures 16 and 18, the force transducers can be offset a distance r, as shown in FIG. 2, from the angular rate axis 20. This provides a leveraging effect to the force transducers 16 and 18 by a ratio of a distance d, as shown in FIG. 3, divided by r. Preferably the ratio d/r is as large as possible, for example, 25 where the distance d is 0.25 inches and the distance r is 0.01 inches. Thus, as a result of angular rotation of the sensor 10 about the axis 20, a Coriolis acceleration will apply a torque to the inertia ring 12 which will be leveraged by the ratio d/r and applied to the force transducers 22 and 24.

In the preferred embodiment of the invention, the inertia ring 12, the center block 14, the flexures 16 and 18 and the dual beam transducers 22 and 24 are all micromachined from a single block of silicon using KOH etching. The resonant beams of the force transducers can be formed in an epitaxial layer that is back biased during the etching of the silicon block.

A pair of magnetic pole pieces 30 and 32, as illustrated in FIGS. 1–4, located on each side of the inertia ring 12 and the center block 14 in combination with a permanent magnet 34 secured to the upper portions of the pole pieces 30 and 32 provides a source of magnetic flux that is applied in a direction normal to the inertia ring 12. Deposited on the upper surface of the inertia ring 12 are two conductive paths 36 and 38 to which a drive current having a frequency ω is applied via a first set of terminal pads 40A and 40B and a second set of terminal pads 42A and 42B respectively. It should be noted that the conductors 36 and 38 can be deposited in gold on one side of the inertia ring 12 as shown in FIG. 1. The drive current in the conductors 36 and 38 in response to the magnetic flux directed through the inertia ring 12 will cause each side, indicated by a pair of reference numerals 44 and 46, of the inertia ring 12 to vibrate at the frequency ω in opposite directions along a vibration axis 48 shown in FIG. 1. Preferably, the drive frequency e is greater than 1 kHz and in particular 1.5 kHz. It should also be noted that the front pole piece 30 is configured with a square aperture 50, as illustrated in FIGS. 1, 3 and 4, in order to provide access for electrical leads (not shown) to the terminals 40A-B and 42A-B and to the force transducers 22 and 24. In addition, as may be seen from FIG. 4, the rear pole piece 32 includes a support member 52 which is bonded to the center block 14 to support the center block 14 and to prevent it from rotating with respect to the sensor pole pieces 30 and 32.

Figure 6:
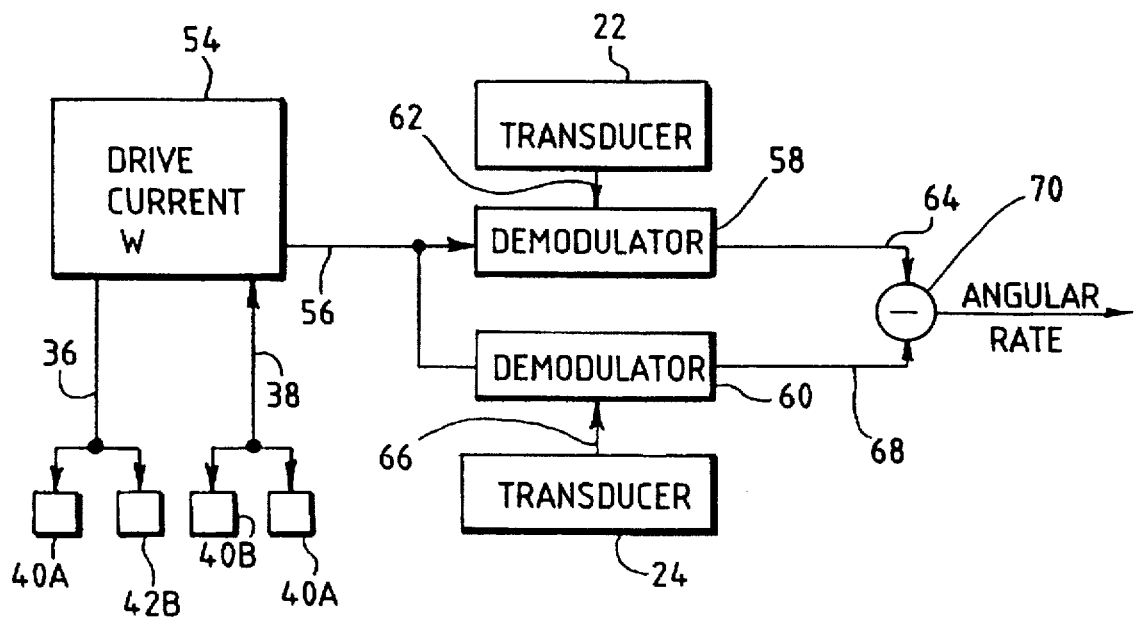
FIG. 6 is a functional block diagram of a processor for use with the sensor of FIG. 1.

In FIG. 6, illustrated in functional block diagram form, is a processor for deriving angular rate information from the sensor 10. A source 54 of drive current at the frequency ω, in addition to providing the drive current in opposite phases to the inertia ring conductors 36 and 38 via the pads 40A-B and 40A, provides a demodulation signal over a line 56 at the frequency ω to a pair of demodulators 58 and 60. As indicated by a line 62 the first transducer 22 applies its frequency output fn to the demodulator 58. The demodulator 58 effectively demodulates the vibrational frequencies of the tines 22' and 22" by summing the counts of the each cycle of the transducer output frequency fn over one half cycle of the frequency ω and inverting the count for the next half cycle of ω. As a result the output of the demodulator on a line 64 will be a digital count representing the frequency of the transducer 22. Similarly, a line 66 indicates that the frequency output fn of the second transducer 24 is applied to the second demodulator 60, the output of which on a line 68 is a digital count representing the frequency fn of the transducer 24. Then the digital counts on the lines 64 and 68 are then subtracted as shown by a symbol 70. Therefore, the output of the subtraction 70, as indicated on a line 72 will be a digital signal representing the angular rate of rotation of the sensor 10 about the axis 20. These signal processing operations, as illustrated in FIG. 6, are all digital and can readily be performed in a microprocessor utilizing counters.

It will be appreciated that the angular rate sensor 10 as described above has a number of substantial advantages.

First, it permits a differential digital signal output thereby avoiding the noise and demodulation errors in analog devices. Secondly, it is possible, because the sensor utilizes a magnetic drive, to operate it in a 1 atmosphere environment. In addition the geometry of the sensor 10 makes it possible to configure the sensor 10 to maximize signal strength along with making it possible to fabricate up to 50 units on a 4 inch silicon wafer.

I claim:

1. An angular rate sensor comprising:

an inertia ring having a first and a second side;

a center block;

a pair of flexures for inertia said inertia ring on said center block for torsional rotation of said inertia ring along an angular rate axis;

a first and a second force sensing transducers connected between said inertia ring and said center block in a push-pull arrangement and in a manner to constrain said inertia ring from rotating about said angular rate axis;

drive means for vibrating said first and second inertia ting sides at a frequency ω in opposite directions along a vibration axis normal to said rate axis; and processing means responsive to said first and second force sensing transducers and said drive means for generating an angular rate signal representing the angular rate of the sensor around said angular rate axis.

2. The sensor of claim 1 wherein said inertia ring, said center block and said first and second force transducers are configure out of a single block of material.

3. The sensor of claim 2 wherein said material is silicon.

4. The sensor of claim 1 wherein each of said first and second force sensing transducers are dual beam transducers.

5. The sensor of claim 4 including means for vibrating said first and second dual beam transducers at a frequency fn.

6. The sensor of claim 5 wherein said drive frequency e is substantially lower than said vibration frequency fn.

7. The sensor of claim 6 wherein said drive frequency is approximately 1.5 kHz.

8. The sensor of claim 7 wherein said vibration frequency fn is approximately 100 kHz.

9. The sensor of claim 1 wherein said sensor includes:

a source of magnetic flux for applying a magnetic flux perpendicularly to said first and second sides of said inertia ring;

a pair of conductors disposed one on said first side of said inertia ring and the other on said second sides of said inertia ring; and wherein said drive means includes drive current means for applying a drive current at said frequency ω to said first and said second conductors.

10. The sensor of claim 9 wherein said source of said magnetic flux includes a first and a second pole piece spaced apart and located on each side of said inertia ring.

11. The sensor of claim 10 wherein said source of said magnetic flux includes a permanent magnet interposed between said first and second pole pieces.

12. The sensor of claim 1 wherein said first force transducer is connected to a first one of said flexures and to a first side of said center block and wherein said second force transducer is connected to a second one of said flexures and to a second side of said center block.

13. The sensor of claim 1 wherein said first and second force transducers are connected to said inertia ring and said center block at an offset distance r from said angular rate axis.

14. The sensor of claim 13 wherein the ratio of d, the distance from the angular rate axis to the ends of said inertia ring, to said offset distance r is greater than one.

15. The sensor of claim 13 wherein said first force transducer is located between a first side of said inertia ring and said center block and wherein said second force transducer is located between a second side of said inertia block and said center block.

16. The sensor of claim 13 wherein said first and second force transducers are located between a first side of said inertia ring and said center block on a first side of said angular rate axis.

17. The sensor of claim 1 wherein said first and second force transducers have an output frequency and said processing means includes first and second demodulator means for demodulating the output of said force transducers at said frequency ω.

18. The sensor of claim 17 wherein the processing means includes means for subtracting the output of said first and second demodulators to generate said angular rate signal.

19. A angular rate sensor comprising:

an inertia ring having a first and a second side configured out of a block of silicon;

a center block configured our of said block of silicon;

a pair of flexures configured out of said block of silicon for inertia said block for torsional rotation of said block along an angular rate axis within said inertia ring;

a first and a second dual beam force sensing transducers having output frequencies fn configured out of said block of silicon connected between said inertia ring and said center block in a push-pull arrangement and in a manner to constrain said center block from rotating about said angular rate axis;

a source of magnetic flux including a first and a second pole piece spaced apart and located on each side of said inertia ring and a permanent magnet interposed between said first and second pole pieces;

drive means, including a pair of conductors disposed one on said first and one on said second sides of said inertia ring responsive to said magnetic flux, for vibrating said first and second inertia ring sides in opposite directions at a frequency ω along a vibration axis normal to said rate axis; and processing means, including means for demodulating said output frequencies f of first and second force sensing transducers at said vibration frequency ω, for generating an angular rate signal representing the angular rate of the sensor around said angular rate axis.

20. The sensor of claim 19 wherein said first and said second force transducers are connected between said inertia ring and said center block at an offset distance r from said angular rate axis.

21. The sensor of claim 20 wherein the ratio between d, the distance from the angular rate axis to the ends of said inertia ring, to said offset distance r is approximately 25.

22. The sensor of claim 20 wherein said drive frequency ω is approximately 100 times lower than said vibration frequency fn.

23. The sensor of claim 22 wherein said drive frequency is approximately 1.5 kHz.

* * * * *

UNITED STATES PATENT AND TRADEMARK OFFICE
CERTIFICATE OF CORRECTION

PATENT NO. : 5,696,323

DATED : March 17, 1998

INVENTOR(S) : Hulsing, II, Rand H.

It is certified that error appears in the above-identified patent and that said Letters Patent is hereby corrected as shown below:

Column 1, line 55: delete [mounting] and substitute therefor -- inertia--.

Column 1, line 56: after "the" (first occurrence), add -- inertia--.

Column 4, line 30: delete [configure] substitute -- configured--.

Column 4, line 48: delete [sides] substitute -- side--.

Column 5, line 25: delete [our] substitute -- out--.

Claim 1, line 4 (column 4, 13): delete [inertia] (first occurrence) and substitute therefor -- mounting --.

Claim 1, line 12 (column 4, line 21): delete [ting] and substitute therefor – ring--.

Claim 15, line 4 (column 5, line 7): delete [inertia] and substitute therefor--mounting--.

Claim 19, line 6 (column 5, line 27): delete [inertia] and substitute therefor -- mounting--.

Signed and Sealed this

Eleventh Day of August 1998

*Attest:*

BRUCE LEHMAN

*Attesting Officer*  *Commissioner of Patents and Trademarks*